US012145385B2

(12) United States Patent
Lewis et al.

(10) Patent No.: US 12,145,385 B2
(45) Date of Patent: Nov. 19, 2024

(54) APPARATUS AND METHOD FOR SECURING INKJET MICR PRINT WITH A SECONDARY PENETRATING INK

(71) Applicant: TROY GROUP, INC., Costa Mesa, CA (US)

(72) Inventors: Brian Lewis, Wheeling, WV (US); Xiaorong Cai, Mount Pleasant, SC (US); Michael R. Riley, Steubenville, OH (US)

(73) Assignee: Troy Group, Inc., Costa Mesa, CA (US)

( * ) Notice: Subject to any disclaimer, the term of this patent is extended or adjusted under 35 U.S.C. 154(b) by 273 days.

(21) Appl. No.: 17/435,518

(22) PCT Filed: Apr. 30, 2020

(86) PCT No.: PCT/US2020/030756
§ 371 (c)(1),
(2) Date: Sep. 1, 2021

(87) PCT Pub. No.: WO2020/223503
PCT Pub. Date: Nov. 5, 2020

(65) Prior Publication Data
US 2022/0009260 A1    Jan. 13, 2022

Related U.S. Application Data

(60) Provisional application No. 62/841,697, filed on May 1, 2019.

(51) Int. Cl.
*B41M 3/14* (2006.01)
*B41J 2/21* (2006.01)
*B41M 5/00* (2006.01)

(52) U.S. Cl.
CPC ............... *B41M 3/144* (2013.01); *B41J 2/21* (2013.01); *B41M 5/0023* (2013.01)

(58) Field of Classification Search
CPC .... B41M 3/144; B41M 5/0023; B41M 3/008; B41J 2/21; B41J 3/60; C09D 11/328;
(Continued)

(56) References Cited

U.S. PATENT DOCUMENTS

| 5,523,167 A * | 6/1996 | Hunt ........................ B41M 3/14 |
| | | 428/206 |
| 2002/0105569 A1* | 8/2002 | Murcia .................... B41J 3/543 |
| | | 347/101 |

(Continued)

FOREIGN PATENT DOCUMENTS

| JP | 2016052751 | 4/2014 |
| JP | 2016221807 | 12/2016 |

OTHER PUBLICATIONS

Zhang, Qi, A Infrared Up-conversion Printing Ink For Engraved Photogravure, Jul. 6, 2016, China, All Pages (Year: 2016).*
(Continued)

*Primary Examiner* — Justin Seo
*Assistant Examiner* — Tracey M McMillion
(74) *Attorney, Agent, or Firm* — Snell & Wilmer LLP

(57) ABSTRACT

A means and method to enhance the security of personalized and variable print-on-demand data on vital records or documents, such as checks, by inkjet printing. A specially formulated penetrating ink prints information on the front side to create an indelibly seamless "dual image" on the reverse side. The reverse image symbiotically complements the primary image on the print side to provide ease of authentication and tamper resistance. Specially formulated MICR ink is used to print information on the front side. Specially formulated penetrating may be different color. Either invis-
(Continued)

ible ultraviolet fluorescent penetrating ink or visible penetrating ink may be used to create the image on the reverse side. The print side and reverse side are printed using single-pen printing by orienting inkjet two different pens in a series.

20 Claims, 6 Drawing Sheets

(58) Field of Classification Search
CPC ......... C09D 11/36; C09D 11/40; C09D 11/50; C09D 11/322; H01F 41/16
See application file for complete search history.

(56) References Cited

U.S. PATENT DOCUMENTS

| | | |
|---|---|---|
| 2004/0218008 A1* | 11/2004 | Tajika ................... B41J 3/60 347/43 |
| 2013/0088553 A1 | 4/2013 | Maennig et al. |
| 2013/0201232 A1 | 8/2013 | Usuda et al. |
| 2017/0106668 A1 | 4/2017 | Evers et al. |
| 2017/0174920 A1* | 6/2017 | Cai ...................... C09D 11/328 |
| 2018/0065394 A1 | 3/2018 | Tsutsui et al. |
| 2019/0071579 A1 | 3/2019 | Cai et al. |

OTHER PUBLICATIONS

PCT; International Search Report and written opinion in the PCT Application No. PCT/US20/30756 dated Jul. 30, 2020.

* cited by examiner

APPARATUS AND METHOD FOR SECURING INKJET MICR PRINT WITH A SECONDARY PENETRATING INK

CROSS REFERENCE TO RELATED APPLICATIONS

Applicant claims the benefit of provisional application U.S. Ser. No. 62/841,697 filed May 1, 2019 for Securing Inkjet (MICR) Print Using a Secondary Penetrating Ink Process. The entire application is incorporating herein by reference.

BACKGROUND OF THE INVENTION

1. Field of the Invention

The present invention relates generally to securing text images and, more specifically, font generated by an inkjet digital printing process onto a pulp/paper substrate.

2. Description of Related Art

Check fraud is a rampant problem affecting individuals worldwide. One of the most common ways fraudulent checks enter the banking system is through clever alterations. These alterations which are commonly referred to as "check washing" are illicit modifications to vital information on the document. These modifications are attempted across various printing platforms by way of chemicals, reprint and physical methods, such as tape or blue tack. Vital information on a check includes printed items such as the amount field and the identification code area which contains a MICR-readable font for routing and account information. Alterations are attempted in these areas to, for instance, falsify the monetary amount. From analog to digital, toner to ink, desktop to industrial. All print methods have come under attack by tenacious criminals.

Work done to safeguard vital information on documents generated by laser print technology is seen in U.S. Pat. No. 6,998,211 for a System for Producing Secure Toner-Based Images and Methods of Forming and Using the Same. This solution directed at laser print technology coats only certain sections of paper with a migration agent. A secondary reverse image is achieved through a dye-receptive reaction causing the dye to be carried to the opposite side of the document from the corresponding adhered toner print.

An attempt to address the problem for inkjet technology is shown in U.S. Pat. No. 10,059,854 for Composition and Method of Making Aqueous Penetrating Inkjet Ink. The solution in the patent uses a single aqueous-based ink to print penetrating characteristics on the paper substrate. The ink composition provides two functions within a single ink.

The present invention, which is directed to inkjet technology, prints indelible images onto a document that provides ease of identification by the reader and tamper hindrance for the criminal. This is accomplished by leveraging the multiple coloring channels on a standard inkjet printer to produce a secondary complementary dual image using a separate ink composition. Each composition used has specific yet symbiotic functional characteristics.

The two separate ink compositions are formulated independently to give distinctive characteristics that, when integrated by the print process, complement each other to produce a homogenous dual image. A *simplex* single-pass inkjet printing process produces the dual image. The reverse image is printed on the front side by splicing through the front printed image to latently penetrate or bleeds through to the reverse side. The remainder of the image stays on the front surface of the printed documents. This produces separate complementary images on either side. The result is a legible front-to-back, corroborating, multi-functional, indelible, perfectly-registered "dual image" which can be used as a second inspection for the original information. These two images, one on the front and one on the reverse side reinforce each other and provide enhanced security and value to the given document and the vital information it contains.

SUMMARY OF THE INVENTION

Single-pass printing is used to create a print image on the print side and a dual mirror image on the reverse side of a paper substrate by orienting separate inkjet pens in series, one pen containing the ink for the print image and the other pen containing ink for creating the reverse side mirror image. The print image may be printed by a MICR inkjet ink in the first pen. The reverse side image may be created by an invisible ultraviolet fluorescent or a visible penetrating ink in the second pen. The second pen is aligned in a series with the first pen to print on the same print line as the first pen.

BRIEF DESCRIPTION OF THE DRAWINGS

The exact nature of this invention, as well as its advantages, will become better understood by reference to the following detailed description when considered in conjunction with the accompanying drawings, in which like reference numerals designate like parts through the figures thereof, and wherein.

DETAILED DESCRIPTION OF THE PREFERRED EMBODIMENTS

Figure 1:
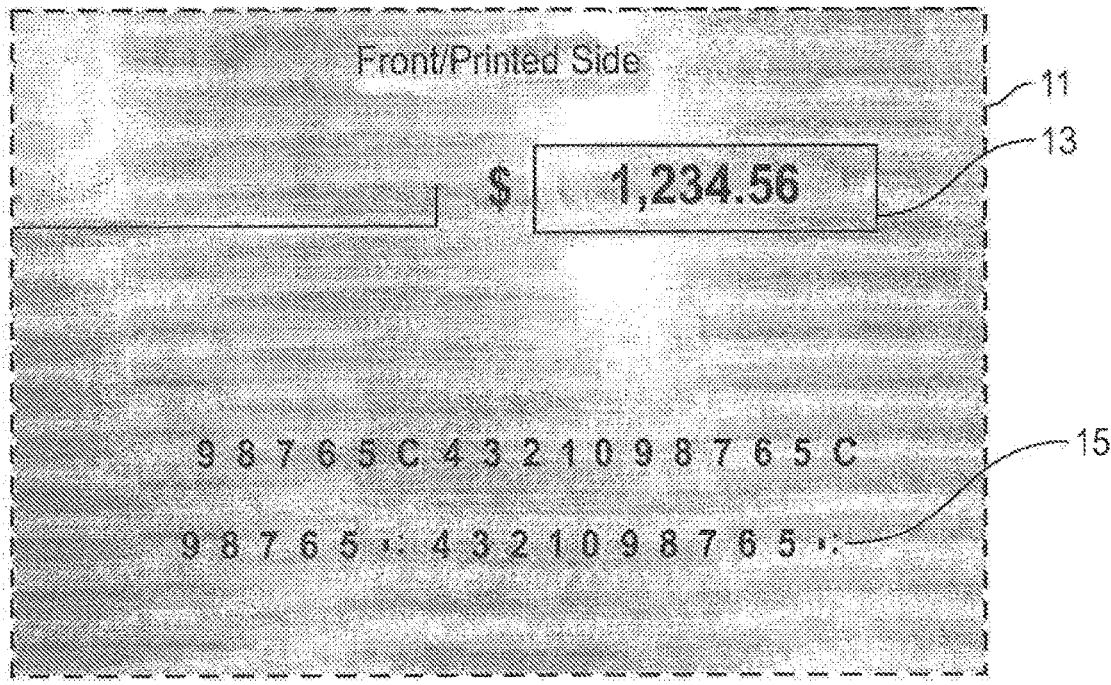
FIG. 1 is an example of the front side of a printed document, specifically a check, incorporating features of the present invention.
Figure 2:
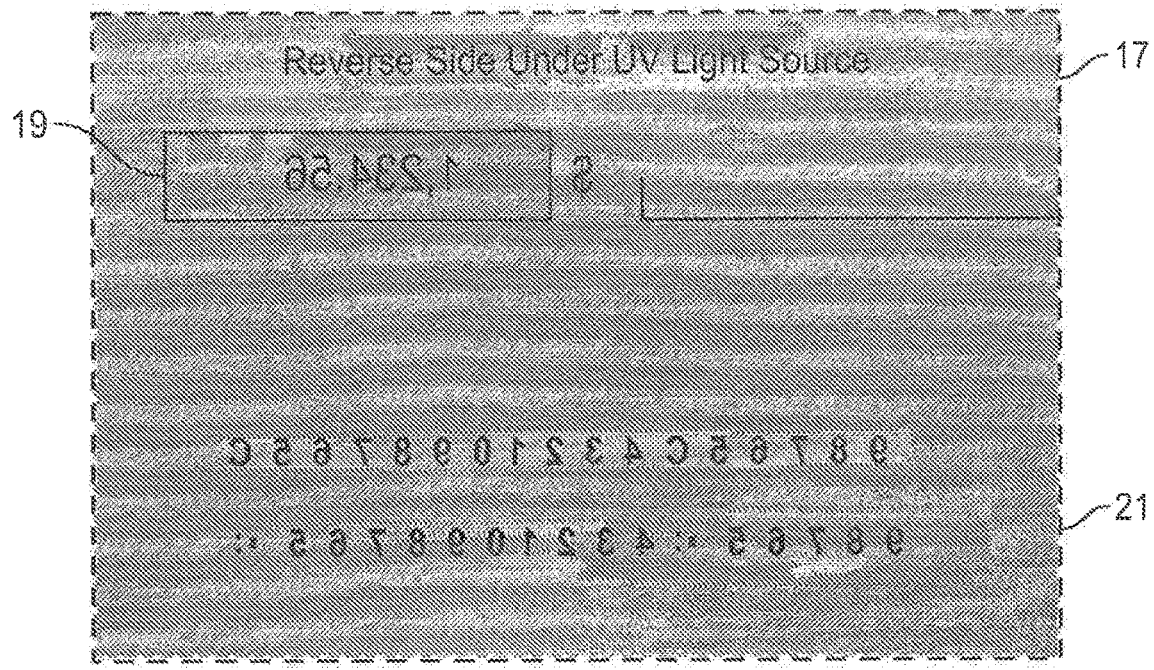
FIG. 2 is an illustration of the reverse side of the document shown in FIG. 1.

FIGS. 1 and 2 illustrate a preferred embodiment of the present invention. The figures display common check information, such as the amount field (13) and the MICR line (15) on a check (11). This information is printed on the front of the document. Because of the secondary ink utilized, indiscernibly separated images have bled through to the reverse side (17) of the check. Exposure to an ultraviolet light source reveals the invisible, indelible, negative mirror image via red fluorescence, such as the amount field (19) and the MICR line (21) on the back, perfectly registered with the black text located on the front (11).

Figure 3:
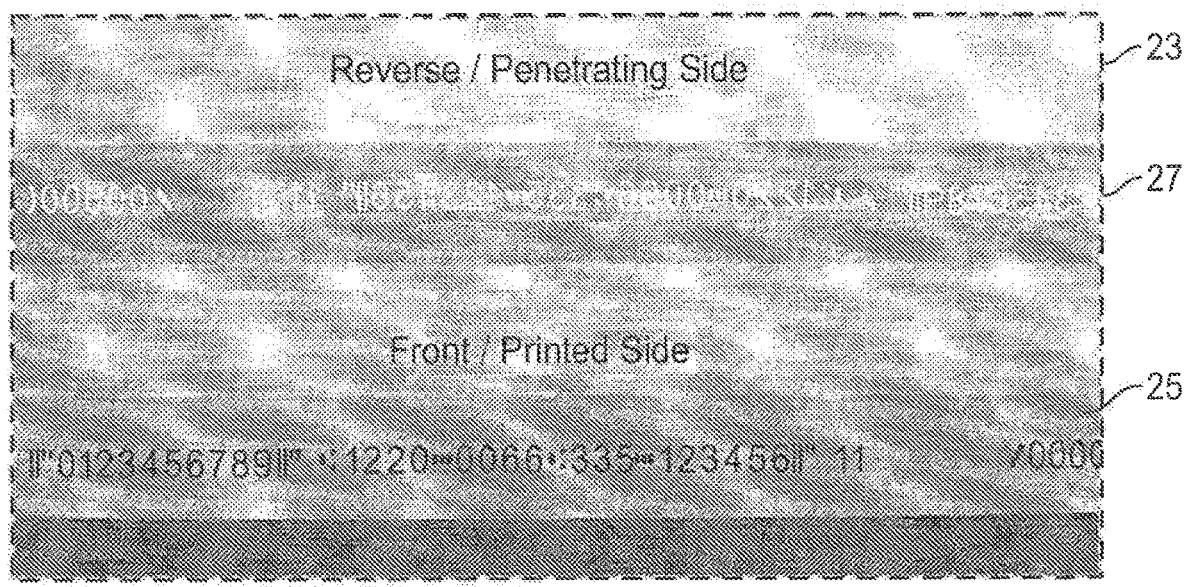
FIG. 3 is an illustration of two similarly-printed documents showing a front and back side of a MICR-printed line.
Figure 4:
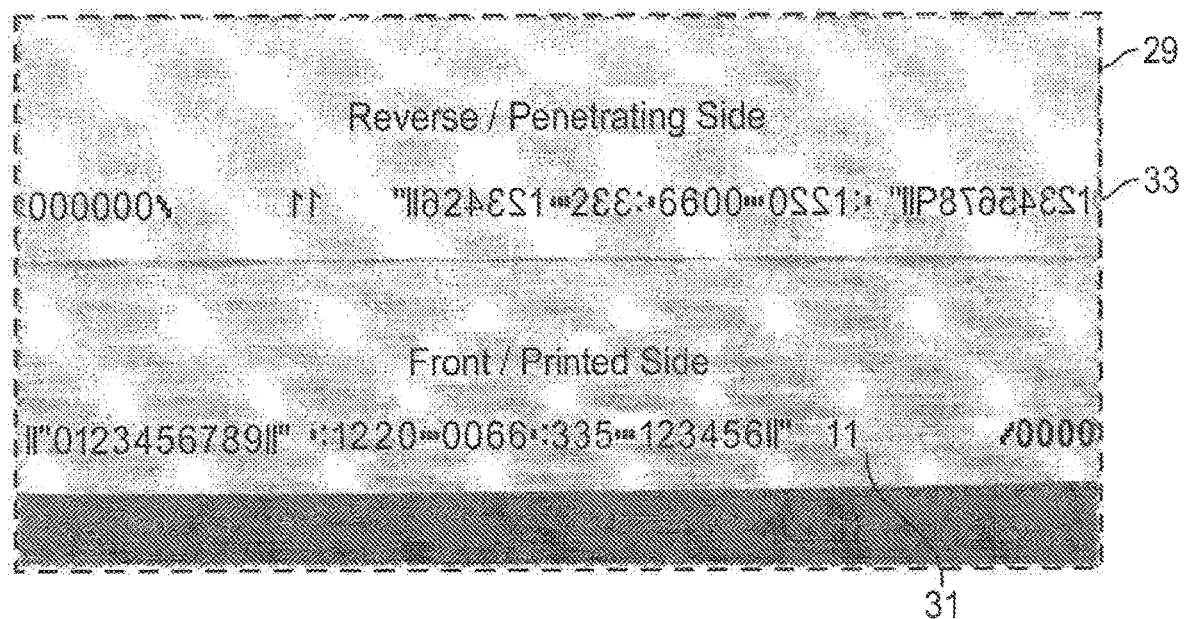
FIG. 4 is an illustration of two similarly-printed documents showing a front and back side of a MICR-printed line.

FIGS. 3 and 4 illustrates alternate embodiments of the invention using visible penetrating inks which creates an overt image for ease of authentication.

The resultant dual image in the embodiments shown in FIGS. 1 to 4 is tamper and forge resistant in three ways. First, inkjet print creates inherently indelible images different than laser printing, which uses toner fused to the substrate. Typical inkjet images cure into the substrate through a natural absorption mechanism. This deposits the functional dye or pigment slightly into the depth of the pulp or paper fibers. Once the ink vehicle has evaporated and dried, this dye or pigment becomes embedded within the substrate. Second, the perfectly-aligned reverse image cannot be duplicated by a photocopier. Any attempted manual registration will be deficient, and more notably, the incorporation of invisible ultraviolet effects will be lost. Third, the same distinctive ink properties that create the penetrating effect can protect the document from a variety of chemical erasures that attempt to modify the document. For instance, an aqueous-based attack intended to modify the original information will not affect the indelible mirror image on the back as it is a solvent-based ink. Conversely, a solvent-based attack will not affect the aqueous-based printed text on the front. Any such attempt will bleed and stain the dye into the substrate creating a tamper-evident blotch.

The present invention utilizes an obscure part of the document, the reverse side, to incorporate secondary printed information. The value gained by this secondary penetrating image is noted by it being perfectly registered with the front as a separate color or function. The example by using an invisible ultraviolet fluorescent ink to provide the distinct fraud resistance described above.

MICR-readable print on checks must adhere to optical clear band background color specifications dictated by the ANSI X9.7-1988 (ANSI X9.100-30) magnetic ink printing standard. Invisible ultraviolet fluorescent ink used in the present invention to create the reverse penetrating image must fully complies with all background reflectance and print contrast signal guidelines. Thereby, the conservation of front-side print space or surface area is an advantage of the present invention.

The invention utilizes two inks which are deployed onto the paper substrate at the same time, creating two images across two ink channels. Registration of the images is achieved by utilizing a single pass, for example, simplex printing approach. This process ensures perfect alignment of the front and reverse text.

The invention utilizes the absorption mechanisms unique to each of the two inkjet inks utilized to develop the two images. The ink carrier fluid used in the two different inks is critical. By varying the carrier fluid, a variety of ink applications can be utilized to display the dual-image, reverse-side penetration.

While FIGS. 1 and 2 illustrate the use of an invisible ultraviolet fluorescent ink to create the reverse side image, FIGS. 3 and 4 illustrate two different examples utilizing visible penetrating inks that create a clearly visible overt image on the reverse side of the check. FIG. 3 illustrates a MICR line (25) printed on the front side of a check (23) by a first ink and the MICR line (27) created on the reverse side of check (23) by a second visible penetrating ink.

FIG. 4 illustrates a specific example of a check (29) having a MICR line (31) printed on the front side of check (29) with a different color visible penetrating ink creating the MICR line (33) on the reverse side of the check (29).

Figure 5:
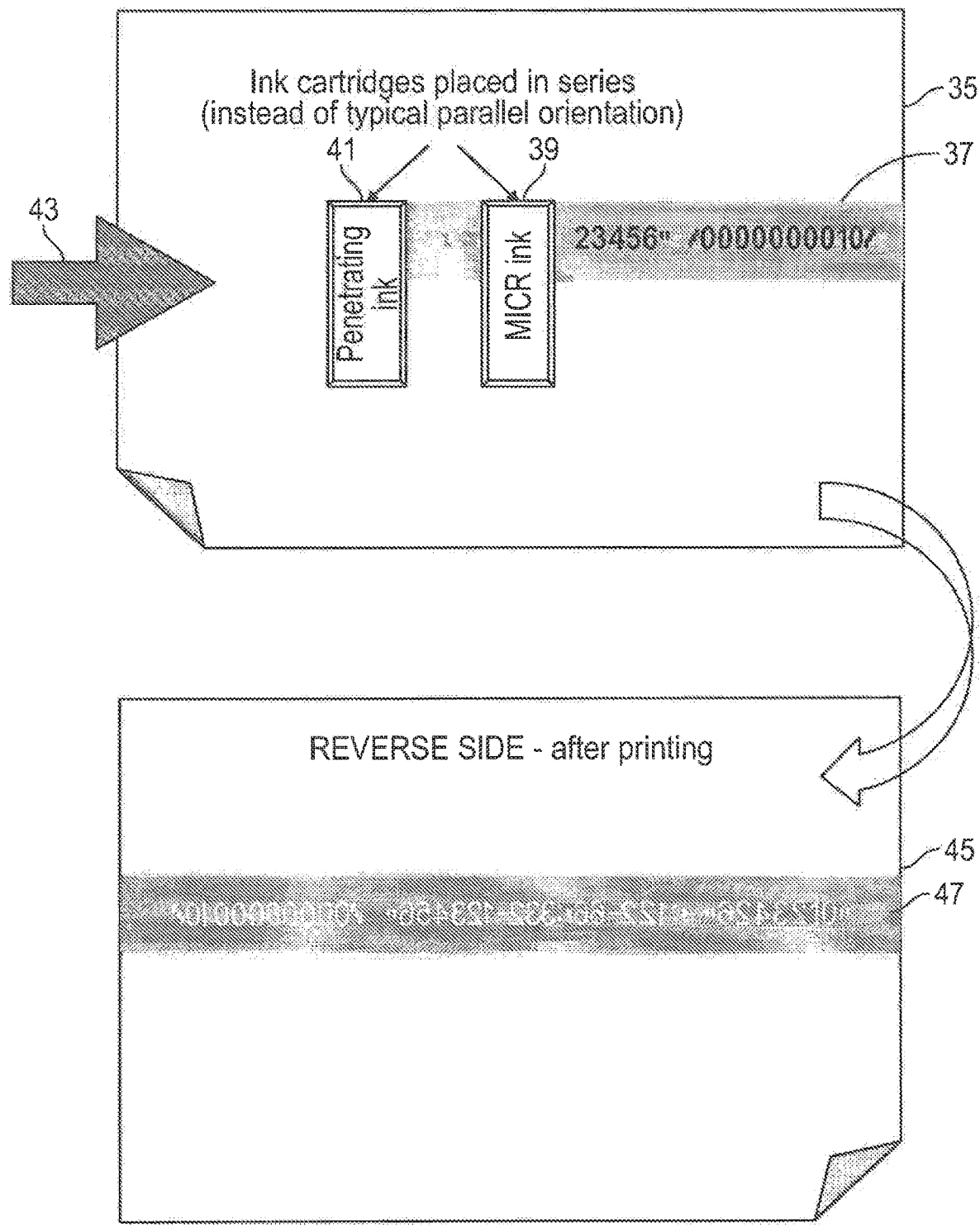
FIG. 5 is a schematic illustration of a mechanical method used to create the printed images shown in FIG. 3.

FIG. 5 illustrates the application of a MICR ink in a cartridge or pen (39) and a penetrating ink in a cartridge or pen (41) to a MICR line (37) on a check, for example, by two separate channels during a single pass (43) of the check (38). The MICR ink contained in the single pen (39) prints MICR print line (37) in the front. The penetrating ink contained in pen (41) prints the same information spliced into the print line on the front of check (35) to create the reverse side image (47) on the reverse side (45) of the check.

Figure 7:
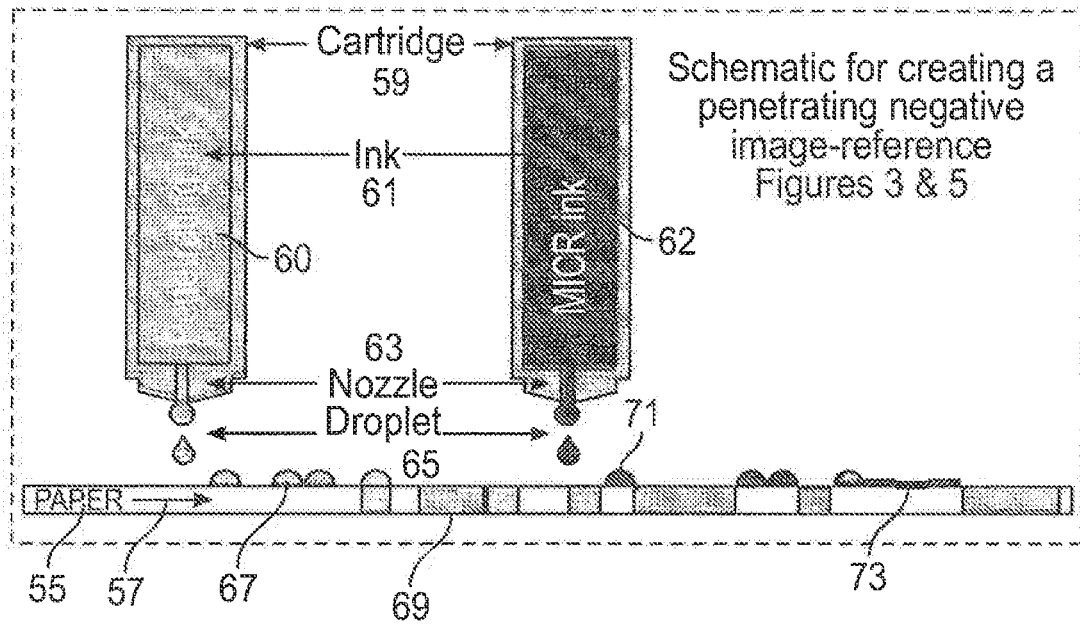
FIG. 7 is a schematic illustration of the elements in the inkjet system used to create the printed images shown in FIG. 3.

FIG. 7 illustrates this process by using the elements of a Hewlett-Packard CMYK desktop inkjet printer. This printer contains multiple ink channels with many closely-arranged nozzles. Hewlett-Packard's thermal inkjet 2.5 technology is also easily adapted to the process of the present invention.

As illustrated in FIG. 7, a pair of cartridges (59) are oriented in series rather than in the standard parallel setup. Each cartridge contains an ink (61). A first cartridge (59) contains a penetrating ink (60). The second cartridge in line contains a MICR ink (62). Each cartridge has a nozzle (63) creating ink droplets (65) that are jetted onto a paper (55) moving in the direction of arrow (57). The droplets (67) of penetrating ink (60) start to penetrate the paper substrate (55) upon contact and are absorbed into the paper substrate (55) to create an image (69) on the opposite side. The MICR ink (62), which is dispersed second in the print line, prints in between the spaces of the droplets of the penetrating ink. Thereby droplet (71) of the MICR ink (62) is spaced between the absorbed droplets (69). The MICR ink droplets (73) only create an image on the front print side of paper (55). The images created by the structure of FIG. 7 is shown in FIG. 5 and FIG. 3.

Figure 6:
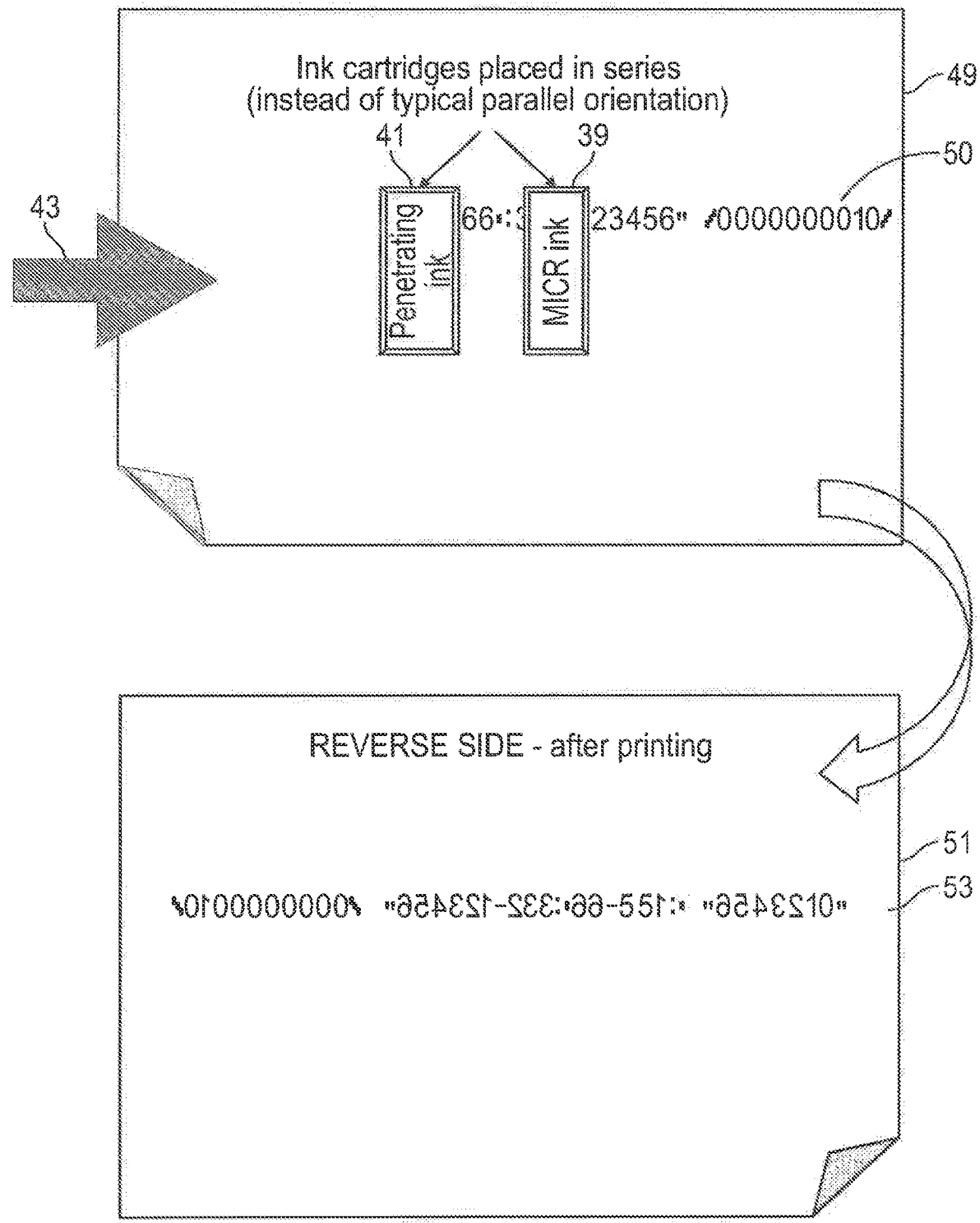
FIG. 6 is a schematic illustration of the mechanical method used to create the printed images shown in FIG. 4.
Figure 8:
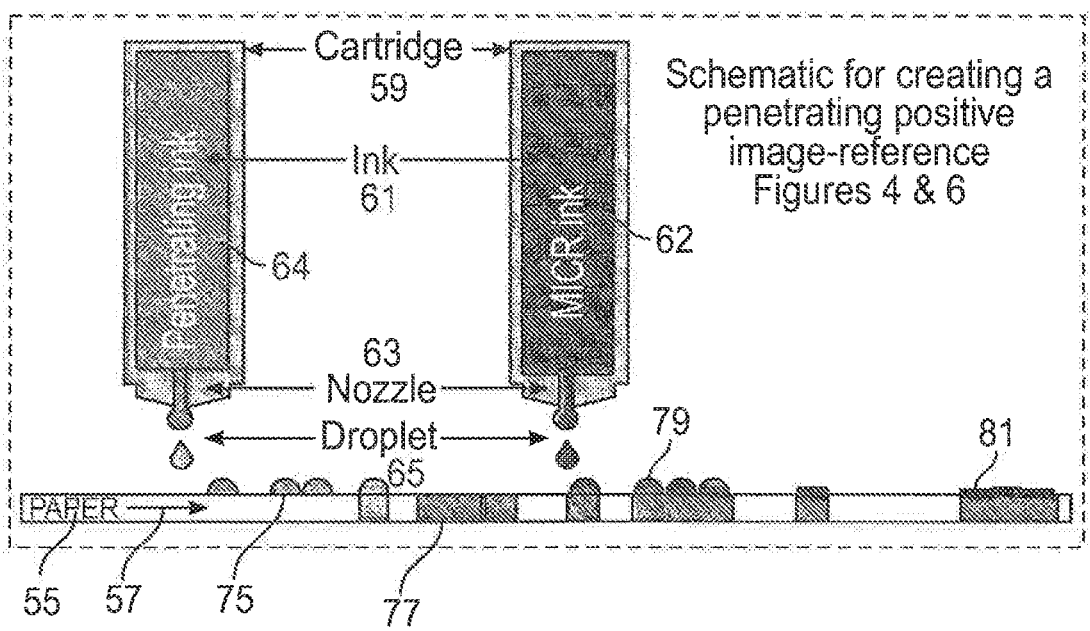
FIG. 8 is a schematic illustration showing the elements of an inkjet system used to create the printed images shown in FIG. 4.

An alternate embodiment is illustrated in FIG. 8, which utilizes two cartridges (59) in series, each cartridge containing an ink (61), each cartridge having nozzles (63) which create droplets (65) jetted onto paper (55) moving in the direction (57). The penetrating ink (64) in the first cartridge has an ink of a different color from the MICR ink (62) in the second cartridge. It creates droplets (75) that fall onto the paper (55) and are absorbed on contact through the paper substrate to create an image (77) on the opposite side. The MICR ink cartridge (62), which is second in line to the penetrating ink cartridge, places its droplets (79) directly over the ink droplets from the penetrating ink. The MICR ink droplets (81) stay on the front print surface. The process illustrated in FIG. 8 creates a penetrating positive image as illustrated in FIGS. 4 and 6. The structure illustrated in FIG. 7 creates a penetrating negative image as illustrated in FIGS. 3 and 5.

By orientating the inkjet pens in series rather than in the standard parallel setup, the printing system of the present invention optimizes the deployment of this invention by leveraging the customizable characteristics of HP's TIG 2.5 print hardware.

The resultant latent dual image created on the reverse side of the print document by the present invention is of utmost importance. While ordinary documents, such as letters and reports, do not require any protection, documents such as checks, birth certificates, automobile titles and academic transcripts require further assurances that they have not been tampered with. By utilizing the present invention, the reader of these vital information documents can feel confident that the information printed thereon is accurate and original.

It is critical to the present invention that specific ink formulations are utilized. These formulations need to meet the basic inkjet print mechanisms and still deliver the technical capabilities needed to deploy the effects of the invention. Thus, one formulation needs to be an aqueous-based pigment or a MICR-readable ink composition for front-side print. The other ink must be a solvent-based migrating dye ink composition to create the reverse side bleed-through mirror image. The characteristics of ink bleed-through must be carefully crafted and considered to allow just the precise amount of absorption into the paper substrate. Too little absorption will not provide enough migration for legibility on the reverse of the print document. Too much absorption will affect legibility in the opposing way. It will soak into the document to the point of adversely affecting readability.

Figure 9:
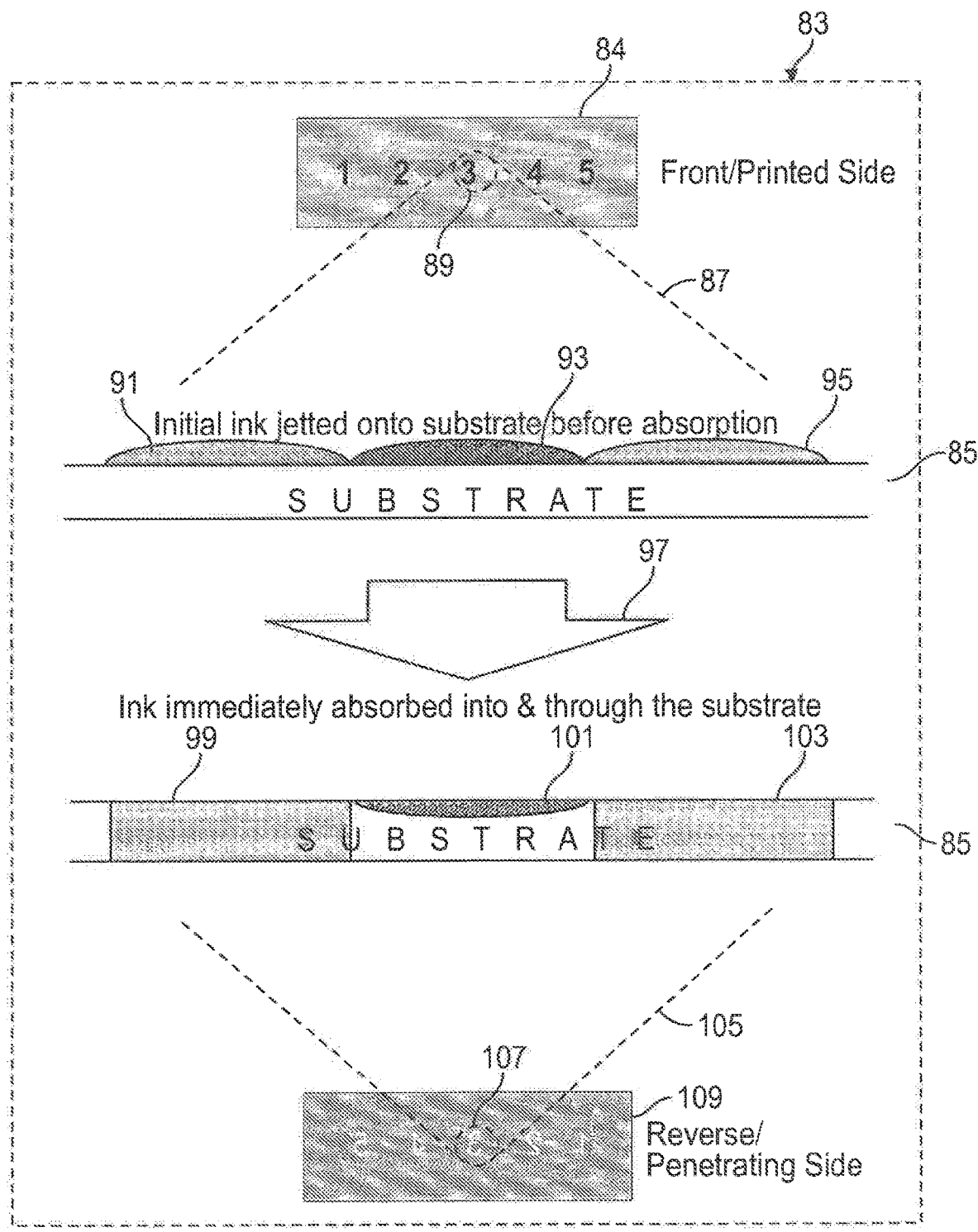
FIG. 9 is a graphical flowchart depicting the ink absorption through a paper substrate used in the present invention to create the resultant printed images shown in FIG. 3.

FIG. 9 is a schematic illustration of the ink absorption mechanism that is critical to the present invention. A paper substrate (83) has a MICR print line (84) printed on the front side of a paper substrate. Looking at a portion (89) of the number 3 magnified and expanded, as illustrated by expansion indicator (87) on a substrate (85) shows penetrating ink droplets (91) and (95) with a front print, black print droplet (93) in between. This print method is illustrated in FIG. 7. As the ink droplets are jetted onto the substrate (85) they are absorbed into and through the substrate (85), almost immediately as indicated by arrow (97). The penetrated ink droplets (99) and (103) create an image on the reverse side, while the black print droplet (101) while slightly absorbed in substrate (85), stays on the print side. The result is the image (109) on the reverse side. The expanded section (107) of the image (109) on the reverse side is illustrated by expansion (105).

This highly-controlled absorption and non-absorption effect requires very specific inkjet ink formulations for the front side image and the reverse side image. By way of example, the necessary formulation for a front-side, primary-printed image requires the use of an aqueous-based ink that may contain a magnetic iron oxide pigment dispersion or be a conventional carbon black pigment dispersion, depending on the preferred application. By way of example, an illustration of a preferred MICR pigment dispersion requires a formulation containing the components listed in Table 1 below.

TABLE 1

| Component Name | Percent |
| --- | --- |
| MICR pigment dispersion | <25 |
| Glycerin | 5-10 |
| 2-Pyrrolidinone | 5-10 |
| 1,2-Propylene glycol | 2-10 |
| Water | 75-92 |

This preferred formulation contains the critical elements required. As is well-understood in the art, additional components would be included to provide other features such as biomicrobial control and surfactants for rheological modifiers. These additives, along with other additives, can and should be included to optimize the performance in terms of print quality, jetting consistency, image permanence, particle size stability (suspension and agglomeration), substrate dry time and pH balance. The finished ink may be prepared by utilizing conventional mixing techniques followed by a common filtration stage.

The primary formula of an aqueous-based inkjet composition utilized by the present invention does not absorb into or penetrate the substrate to the point of over-migration through its width. This is important for the successful deployment of the printed image so that the result in primary print appears common and equivalent to normal, traditional print standards and expectations. The textural images are clear and legible. There are no deficiencies to the text matrices, i.e., no smearing, bleeding, banding, feathering, extraneous droplets or streaking, and only appearing on the front side of the document.

If a MICR-readable composition is utilized, the magnetic properties of the ink must meet the functional criteria or signal level according to the ANSI standards. The appropriate deposition of magnetic particulate matter provides effective and necessary remanence, that is, the magnetic signal output needed to meet these established standards.

The formulation for the reverse side, secondary printed information, created by the penetrating ink formulation, requires a solvent-based ink formulation. This ink is distinctly different from the front side image and has a different optical function from the front side image. The ink composition utilized to create the reverse side image is not limited to a single color and/or single optical function, as described here, only as the examples. For instance, the specific function of the reverse side penetrating ink that uses an invisible red ultraviolet fluorescence that is authenticated by placement of the document underneath an ultraviolet light source is only one example. Focusing specifically on the preferred embodiment of an invisible ultraviolet fluorescent ink formulation, a preferred embodiment of the basic elements is illustrated in Table 2 below.

TABLE 2

| Component Name | Percent |
| --- | --- |
| UV pigment dispersion | <6 |
| Ethyl alcohol | 5-10 |
| Acetone | 5-10 |
| 1-Butanol | 2-10 |
| 1-Methoxy-2-propanol | 75-92 |

This second ink formulation can also be enhanced with any number of additional additives designed to support binding forces of the pigment, control print head nozzle open time or improve any other contribution. These additives can be classified into chemical groups such as surfactants, binders, surface modifiers and co-solvents.

The reverse side ink formulation is designed to immediately penetrate through the width of the paper substrate to the reverse side. This formulation is designed with the specific intention of penetrating at a distinct migration pathway and emphasis. The sole purpose of this penetrating ink and the resultant image is to symbiotically complement the primary image in a legibly harmonized manner. The desired optical effect would be comprised if the absorption/evaporation behaviors of the carrier fluid of this ink is not properly engineered. Whether appearing as either a positive or negative image on the reverse side once jetted onto the paper substrate, the penetrated ink should produce textural, near images that are clear and legible. Any over-migration will impair its readability and ultimately its validation and effectiveness.

In alternate embodiments to the preferred embodiments of the invention as described, a visible dye or infrared upconverting pigment can be substituted for the ultraviolet pigment. Various combinations of optical effects can be utilized within the solvent-based, bleed-through formula to achieve the corroborating reverse-side image. Furthermore, various types of visible pigments can also be utilized to form the primary printed image. It should be understood by those who specialize in formulating inkjet inks that these various medications, substitutions and adaptations can be embraced by the present invention without departing from the scope of the invention.

What is claimed is:

1. A system for printing an image on a print side of a paper substrate and a mirror image on a reverse side of the paper substrate, the system comprising:
   a first ink configured to indelibly print upon a paper substrate;
   a first inkjet pen containing the first ink for indelibly printing the image on the print side of the paper substrate;
   a second ink configured to bleed through the paper substrate; and
   a second inkjet pen located on the same print path as the first inkjet pen containing the second ink for printing the same image on the print side, the image printed by the second ink bleeding through the paper substrate to create a mirror image on the reverse side of the paper substrate.

2. The system of claim 1 wherein the second inkjet pen prints the image on the paper substrate before the first inkjet pen prints the image on the paper substrate.

3. The system of claim 1 wherein the first ink is an aqueous-based inkjet ink.

4. The system of claim 1 wherein the second ink is a solvent-based inkjet ink.

5. The system of claim 4 wherein the solvent based inkjet ink is a different color from the first ink.

6. The system of claim 4 wherein the solvent-based inkjet ink is an invisible ink, the image created visible only under specialized lighting.

7. The system of claim 4 wherein the solvent-based inkjet ink contains an invisible ultraviolet fluorescent pigment.

8. The system of claim 4 wherein the solvent-based inkjet ink contains a visible dye.

9. The system of claim 4 wherein the solvent-based inkjet ink contains an infrared up-converting pigment.

10. The system of claim 3 wherein the aqueous-based inkjet ink contains a carbon black pigment dispersion.

11. The system of claim 3 wherein the aqueous-based inkjet ink contains a magnetic iron oxide (MICR) pigment dispersion.

12. The system of claim 3 wherein the aqueous-based inkjet ink comprises:
   a MICR pigment dispersion equal to or less than 25% by weight of the inkjet ink;
   glycerin in the range of 5% to 10% by weight, inclusive;
   2-pyrrolidinone in the range of 5% to 10% by weight, inclusive;
   1, 2 propylene glycol in the range of 2% to 10% by weight, inclusive; and
   water in the range of 75% to 92% by weight, inclusive.

13. The system of claim 4 wherein the solvent-based inkjet ink comprises:
   a UV pigment dispersion equal to or less than 6% by weight of the inkjet ink;
   ethyl alcohol in the range of 5% to 10% by weight, inclusive;
   acetone in the range of 5% to 10% by weight, inclusive;
   1-butanol in the range of 2% to 10% by weight, inclusive; and
   1-methoxy-2-propanol in the range of 75% to 92% by weight, inclusive.

14. A method of printing an image on a print side of a paper substrate and a mirror image on a reverse side of the paper substrate, comprising:
   indelibly printing, using a first ink, the image on the print side of the paper substrate along a print path; and
   using a second ink for printing the same image on the print side of the paper substrate along the same print path, the second printed image bleeding through the paper substrate to create a mirror image on the reverse side of the paper substrate.

15. The method of claim 14 wherein the first ink is aqueous-based.

16. The method of claim 15 wherein the second ink is solvent-based.

17. The method of claim 16 wherein the second ink is used to print the image on the paper substrate before the first ink is used to print the image on the paper substrate sequentially on the same print path.

18. The method of claim 16 wherein the solvent-based ink is a different color from the first ink.

19. The method of claim 16 wherein the solvent-based ink is an invisible ink viewable only under specialized lighting.

20. The method of claim 16 wherein the solvent-based ink is an invisible ultraviolet fluorescent ink.

* * * * *